United States Patent Office 3,006,895
Patented Oct. 31, 1961

3,006,895
VINYLBENZYL KETONES AND ESTERS AND POLYMERS THEREOF
Richard C. Sovish, Midland, Mich., assignor to The Dow Chemical Company, Midland, Mich., a corporation of Delaware
No Drawing. Filed Apr. 27, 1959, Ser. No. 808,901
23 Claims. (Cl. 260—63)

This invention relates to certain new vinylbenzyl ketones and esters and to homo-polymers and copolymers thereof. Specifically, it relates to new compositions of matter comprising as an essential constituent a membe of the class consisting of (1) monomeric compounds having the formula:

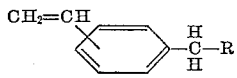

wherein the vinyl group may be in the ortho or para positions and wherein R is a substituent moiety having a moiety molecular weight between about 57 and about 207, said moiety being composed of atoms selected from the group consisting of C, H, O and F, said moiety always containing carbon, hydrogen, and oxygen, said moiety always containing a double bonded oxygen, less than 5 oxygen atoms, less than 9 carbon atoms, and less than 7 fluorine atoms, said fluorine atoms, when present, being on a terminal carbon atom, all of said carbon atoms in said moiety being saturated, and wherein said carbon, hydrogen, oxygen and fluorine atoms form ketone or ester functional groups; and (2) polymeric bodies containing at least 10 percent by weight of the recurring group

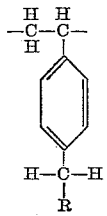

wherein R is a substitutent as defined above.

The monomers of the present invention are prepared by the reaction of the mixed isomers of vinylbenzyl chloride, that is, a mixture of about 20 percent ortho isomer and 80 percent para isomer, with the sodium salt of active methylene compounds such as, for example, acetylacetone, dibenzoylmethane, benzoylacetone, malonic esters, and ethylacetoacetate. Advantageously the reaction is carried out in an inert solvent such as absolute alcohol, chloroform, carbon tetrachloride and the like. The reaction temperature may be any temperature from room temperature to the reflux temperature of the reaction mixture, and is governed by the stability of the reactants and products and the speed of reaction. A reaction time of from about 1 to about 40 hours may be used, although a time of from about 15 to about 25 hours is preferable. The monomers are purified by fractionation in the presence of an inhibitor such as α-naphthoquinone. To obtain highly pure vinylbenzylacetone it has been found that fractionation must be carried out in the presence of an inorganic base such as sodium hydroxide, potassium hydroxide, potassium carbonate and the like.

The new vinylbenzyl ketone and ester monomers undergo polymerization and copolymerization when subjected to most of the conventional procedures, including polymerization in mass, in aqueous emulsion and in solution. Suitable catalysts or initiators of polymerization include the azo catalysts, such as azobisisobutyronitrile, peroxygen catalysts such as potassium persulfate and actinic radiations including ultra-violet, X-ray and gamma radiations.

The polymeric products, as will be described, vary from tough and rubbery to brittle materials, and from translucent and white to clear. They are useful in film forming latexes, monofilaments, and as clear adhesives for laminating glass.

Some of the monomers and polymers of the present invention are useful as chelating agents, as will be described in the following examples which are given for the purposes of illustration but are not to be construed as limiting the invention thereto.

EXAMPLE 1.—PREPARATION OF VINYLBENZYL-ACETONE

A mixture of 750 milliliters of absolute ethanol and 162 grams (3.0 moles) of sodium methoxide was placed in a 2 liter three-necked flask equipped with a condenser, mechanical stirrer and dropping funnel, and 300 grams (3.0 moles) of acetylacetone added slowly while the mixture was stirred. After completing this step, 304 grams (2.0 moles) of vinylbenzyl chloride (a mixture of approximately 20 percent ortho isomer and 80 percent para isomer) was added dropwise over a one hour period with continued stirring, and the resulting solution was then heated at reflux temperature for 18 hours. Most of the ethanol solvent was then removed by evaporation on a steam bath at 400 millimeters of mercury pressure and replaced by an equal volume of water. The resulting mixture was stirred for 18 hours, the oil and water layers separated and the oil layer dried with Drierite. Flash distillation of the crude material in the presence of α-naphthoquinone as a polymerization inhibitor resulted in the collection of 230 grams of material boiling at 80–120° C. at 0.6 to 0.9 millimeter of mercury pressure absolute. This product was allowed to stand overnight in the presence of sodium hydroxide pellets and then fractionated through a 1 x 12 inch glass helices-packed column. The vinylbenzylacetone boiled at 109–112° C. at 1.9 millimeters of mercury pressure absolute. It was water-white, sweet smelling, and gave a negative ferric chloride beta-diketone test, a positive ketone and unsaturation test with 2,4-dinitrophenylhydrazine and bromine-carbon tetrachloride reagent respectively, and was easily polymerized to a crystal clear styrene-like polymer by heating alone or in the present of a peroxide or azobisisobutyronitrile catalyst. The refractive index, $n_D^{26}$ was 1.5421.

*Analysis.*—Calculated for $C_{12}H_{14}O$: C, 82.7; H, 8.0. Found: C, 82.1; H, 7.9.

EXAMPLE 2.—PREPARATION OF VINYLBENZYL-ACETYLACETONE

The reaction of Example 1 was repeated with the exception that the crude reaction product was washed with water and immediately separated, dried and fractionated. Vinylbenzylacetylacetone was collected at 118–120° C. at 0.5 millimeters of mercury pressure absolute. The index of refraction $n_D^{25}$, was 1.5513.

EXAMPLE 3.—PREPARATION OF VINYL-BENZYLACETYLACETONE

In an alternative method the sodium salt of acethylacetone, 43 grams (0.33 mole) was dissolved in 250 milliliters of absolute ethanol, 51 grams (0.33 mole) of vinylbenzylchloride was added, and the mixture allowed to stand at room temperature for one week. The ethanol was distilled off, the salt removed by filtration and the oil layer distilled. The fraction boiling at 94–125° C. at 0.4 to 0.6 millimeter of mercury pressure absolute was retained and had a refractive index, $n_D^{26}$ of 1.5477.

This fraction gave a purple coloration with ferric chloride solution, gray-green crystals with excess copper acetate solution, and was a yellow liquid. Refractionation at 108–118° C. at 0.3 millimeter of mercury pressure absolute gave a monomer which polymerized only on long heating with a catalyst.

*Analysis.*—Calculated for $C_{14}H_{16}O_2$: C, 77.7; H, 7.46. Found: C, 78.1; H. 7.31.

The copper derivative prepared by the addition of the monomer to ammoniated copper acetate was recovered by filtration and recrystallized from alcohol to yield fibrous crystals that decomposed at 230° C. but did not melt.

*Analysis.*—Calculated for $C_{14}H_{15}O_2Cu_{0.5}$: Cu, 12.9. Found: Cu, 12.0.

EXAMPLE 4.—PREPARATION OF VINYL-BENZYLACETOPHENONE

Following the procedure of Example 1, vinylbenzylacetophenone was prepared by the reaction of 4.22 grams (0.019 mole) of dibenzoylmethane and 2.56 grams (0.017 mole) of the mixed isomers of vinylbenzylchloride. The product, 4.5 grams, has a boiling point of 131–141° C. at 0.2–0.3 millimeter of mercury pressure absolute, decolorizes potassium permanganate and bromine-carbon tetrachloride solutions, has a sweet odor and polymerizes slowly on heating with an azo catalyst. The 2,4-dinitrophenylhydrazone melts at 117–119° C.

*Analysis.*—Calculated for $C_{23}H_{20}O_4N_4$: N, 14.00. Found: N, 13.96.

EXAMPLE 5

Following the procedure of Example 4, the reaction of 10.33 grams (0.064 mole) of benzoylacetone with 8.69 grams (0.057 mole) of the mixed isomers of vinylbenzylchloride gave a mixture of vinylbenzylacetone and vinylbenzylacetophenone. The products were separated by fractionation and the semicarbazone derivatives prepared. The semicarbazone of vinylbenzylacetone had a melting point of 172–174° C.

*Analysis.*—Calculated for $C_{13}H_{17}ON_3$: N, 18.2. Found: N, 18.3.

The semicarbazone of vinylbenzylacetophenone melted at 171–172° C. and gave a mixed melting point with the semicarbazone of vinylbenzylacetone of 154–158° C., indicating that these are not the same compound.

*Analysis.*—Calculated for $C_{18}H_{19}ON_3$: N, 14.33. Found: N, 15.20.

EXAMPLE 6.—PREPARATION OF DIETHYL-VINYLBENZYLMALONATE

A mixture of 250 milliliters of absolute ethanol and 27.0 grams (0.5 mole) of sodium methoxide was placed in a 500 milliliter three-necked flask equipped with a condenser, stirrer and dropping funnel, and 80.1 grams (0.5 mole) of diethyl malonate was added dropwise while stirring. After stirring for 30 minutes 68.7 grams (0.45 mole) of the mixed isomers of vinylbenzylchloride was added in a dropwise manner and the reaction mixture heated at reflux temperature for 2½ hours. The alcohol was evaporated and an equivalent amount of water added. The oil layer was separated, washed with sodium bicarbonate solution and water, dried over Drierite, and flash distilled. The fraction boiling at 132–160° C. at 0.7 millimeter of mercury pressure absoltue was refractionated. The fraction boiling at 130–150° C. at 0.4 millimeter of mercury pressure had a refractive index, $n_D^{25}$ of 1.5138 and a saponification equivalent of 135.9. The fraction boiling at 145–148° C. at 2 millimeters had a refractive index, $n_D^{25}$ of 1.5174 and a saponification equivalent of 139.1. This fraction was redistilled at 140–142° C. at 1 millimeter. The product had a refractive index, $n_D^{25}$ of 1.5152. The saponification equivalent of diethyl vinylbenzylmalonate is 138.6.

EXAMPLE 7.—PREPARATION OF ETHYL VINYLBENZYLACETOACETATE AND ETHYL VINYLBENZYLACETATE

The reaction of 65.1 grams (0.5 mole) of ethyl acetoacetate with 68.7 grams (0.45 mole) of the mixed isomers of vinylbenzylchloride was carried out as in Example 6, with the exception that the reactants were heated at reflux for 20 hours. Ethyl vinylbenzylacetoacetate was obtained in admixture with vinylbenzylacetone, vinylbenzylacetic acid and ethyl vinylbenzylacetate, having a boiling point of 142–144° C. at 0.8 millimeter of mercury pressure absolute.

This mixture was refractionated yielding ethyl vinylbenzylacetate, having a boiling point of 123–128° C. at 1.5 millimeters of mercury pressure absolute, and a refractive index, $n_D^{25}$ of 1.5292.

*Analysis.*—Calculated for $C_{13}H_{16}O_2$: C, 76.47; H, 7.84. Found: C, 75.23; H, 7.42.

The ethyl vinylbenzylacetoacetate boiled at 144–148° C. at 2 millimeters of mercury pressure absolute and had a refractive index, $n_D^{25}$ of 1.5245.

*Analysis.*—Calculated for $C_{15}H_{18}O_3$: C, 73.16; H, 7.35. Found: C, 73.21; H, 7.15.

EXAMPLE 8.—PREPARATION OF VINYL-PHENYLPENTANEDIONE-2,4

A mixture of 1.8 grams (0.08 mole) sodium, 10 grams (0.05 mole) of ethyl vinylphenylacetate, and 2.3 grams (0.04 mole) acetone was allowed to stand for 18 hours in dry ethyl ether. The solution was then decanted from the sodium metal and water added to the ether layer. After mixing, the water layer was separated and acidified. A red oil formed which gave a positive ferric chloride diketone test and formed a green semi-solid product with a copper acetate solution.

EXAMPLE 9.—PREPARATION OF 1-VINYLBENZYLACETYLTRIFLUOROACETONE

A mixture of 21.3 grams (0.15 mole) of ethyl trifluoroacetate in 25 milliliters of dry ether was slowly added to a stirred suspension of 16.2 grams (0.3 mole) of sodium methoxide in 100 milliliters of absolute ether over a twenty minute period, and was followed by the slow addition of 26.1 grams (0.15 mole) of vinylbenzylacetone. The mixture was stirred at room temperature overnight and then poured into 250 milliliters of ice. The aqueous phase was separated, washed with ether, acidified, extracted with ether, and the ether solution dried and distilled to give a brown liquid boiling at 114–116° C. at 1.9 millimeters of mercury pressure absolute. On addition of a saturated copper acetate solution in water a black, crystalline product formed which is the copper chelate.

EXAMPLE 10.—PREPARATION OF 1-VINYLBENZYLPENTANEDION-2,4

A solution of 44 grams (0.5 mole) of redistilled ethyl acetate in 50 milliliters of dry benzene was added to a stirred suspension of 27 grams (0.5 mole) of sodium methoxide in 200 milliliters of dry benzene, the mixture cooled to about 5° C. and a solution of 43.5 grams (0.25 mole) of vinylbenzylacetone dissolved in 100 milliliters of dry benzene added. This mixture was allowed to stand overnight at room temperature. An equal volume of water was added, the aqueous portion separated, acidified, extracted with benzene and the benzene solution dried over calcium sulfate. The benzene was evaporated on a steam bath and a small amount of methanol and excess copper acetate solution added. A dark blue precipitate formed which was recovered by filtration, washed with water, and dried. Crystallization from benzene gave a blue solid melting at 182–184° C.

*Analysis.*—Calculated for $C_{14}H_{15}O_2Cu_{0.5}$: Cu, 12.9. Found: Cu, 13.1.

A portion of the copper chelate was decomposed with a 1/1 sulfuric acid mixture in benzene. A yellow oil was obtained which boiled at 144–146° C. at 1.5 millimeters of mercury pressure absolute and had a refractive index, $n_D^{25}$ of 1.5619.

Analysis.—Calculated for $C_{14}H_{16}O_2$: C, 77.78; H, 7.41. Found: C, 77.74; H, 7.39.

EXAMPLE 11.—PREPARATION OF 1-VINYLBENZYL-4-PHENYLBUTANEDIONE-2,4

The above procedure was followed with the exception that 75 grams (0.5 mole) of ethyl benzoate was substituted for the ethyl acetate. The copper chelate melted at 132–136° C.

EXAMPLE 12.—POLYMERIZATION OF VINYLBENZYLACETONE

Vinylbenzylacetone was polymerized by heating alone at 60° C. to 100° C. for from 2 to 20 hours or by heating at 60° C. in the presence of either benzoyl peroxide or azobisisobutyronitrile. The polymer was a thick, viscous, colorless product which was soluble in benzene and methyl ethyl ketone and was precipitated by heptane, methanol or cyclohexane. By precipitating from benzene into cyclohexane a fluffy, powdery polymer was obtained which was extremely easy to filter, wash, and dry, and had a melting range of 121–138° C. The polymer yielded clear, brittle films when cast from a solvent. Extruded filaments of melted polymer were brittle. The polymer melt formed a strong bond when placed between two sheets of glass.

EXAMPLE 13.—COPOLYMERIZATION OF VINYLBENZYLACETONE

Mixtures of 10 milliliters of the indicated monomers were mixed with 10 milliliters of vinylbenzylacetone, a trace of azobisisobutyronitrile added and the mixtures heated at 70° C. to cause partial polymerization and production of copolymers as shown in the following table.

Table I

| Monomer | Heating time in hrs. | Grams yield of precipitated polymer | M.P., °C. | Percent vinylbenzylacetone in polymer | Properties |
|---|---|---|---|---|---|
| Acrylonitrile | 0.5 | 8.5 | 135–145 | 15–20 | Tough, translucent. |
| Styrene | 4.0 | 3.0 | 145–155 | 15–20 | Clear, brittle. |
| Methylmethacrylate | 1.0 | 13.2 | 150–155 | 50 | White, tough. |
| Vinylacetate | | | | >95 | Clear. |
| Acrylic acid | | | | | Insoluble, transparent gel. |
| Acrylamide | | | | | Opaque, insoluble gel. |

EXAMPLE 14

The reaction of crude vinylbenzylacetylacetone with ammoniated copper acetate solution results in the formation of a thick, green, cross-linked polymer from which copper can be slowly leached by the action of acids. This polymer holds the copper by chelation as the copper is not removable by water alone.

EXAMPLE 15.—EMULSION POLYMERIZATION OF VINYLBENZYLACETONE

A mixture of 8.0 grams of vinylbenzylacetone, 17 grams of water, 0.085 gram of sodium lauryl sulfate, 0.085 gram of sodium bicarbonate, and 0.085 gram of potassium persulfate was polymerized in a capped bottle by tumbling in a constant temperature bath at 65° C. for 17 hours. The resulting stable latex contained 32 weight percent solids. A cast film was brittle and clear. The dry polymer melted at 132–138° C.

Emulsion copolymers of vinylbenzylacetone (VBA) were prepared in the same manner as Example 15. The results are given in Table II.

Table II

| Comonomer | Grams | Grams VBA | Percent solids | Film properties | M.P., °C. |
|---|---|---|---|---|---|
| Butadiene | 3.2 | 4.8 | 33 | Yellow, tough, rubbery; good adhesion to steel. | |
| Styrene | 2.4 | 2.4 | 32.3 | Tough and rubbery. | |
| Butadiene | 3.2 | | | | |
| Styrene | 4.8 | 3.2 | (1) | Clear, brittle | 165–168 |
| Acrylonitrile | 4.8 | 3.2 | (2) | Clear, strong formed monofilaments on hot stretching. | 325 |

[1] Latex was thick. Polymer recovered by evaporation.
[2] Emulsion coagulated. Polymer recovered by evaporation.

Various modifications may be made in the present invention without departing from the spirit or scope thereof, and it is understood that I limit myself only as defined in the appended claims.

I claim:
1. Compounds having the formula

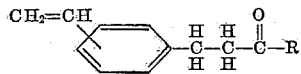

wherein R represents a member of the group consisting of methyl, phenyl, 3,3,3-trifluoroacetonyl, acetonyl and phenacyl.

2. A compound of the group consisting of vinylphenylpentanedione-2,4 and compounds having the formula

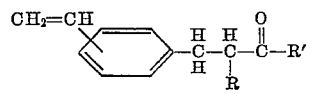

wherein R is a member of the group consisting of alkyl and alkoxy carbonyl groups containing from 1 to 4 carbon atoms and hydrogen, R' is a member of the group consisting of alkyl and alkoxy carbonyl groups containing from 1 to 4 carbon atoms and the phenyl carbonyl radical, and radicals of the formula

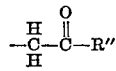

wherein R" represents a member of the group consisting of alkyl and trifluoroalkyl groups containing from 1 to 4 carbon atoms and the phenyl radical.

3. Monomeric vinylbenzylacetone, water-white sweet-smelling liquid boiling at 109–112° C. at 1.9 millimeters of mercury pressure absolute and having a refractive index, $n_D^{26}$ of 1.5421.

4. Monomeric vinylbenzylacetylacetone, having a boiling point of 118–120° C. at 0.5 millimeter of mercury pressure absolute and having a refractive index, $n_D^{25}$ of 1.5513.

5. Monomeric vinylbenzylacetophenone, having a boiling point of 131–141° C. at 0.2–0.3 millimeter of mercury pressure absolute.

6. Monomeric diethyl vinylbenzylmalonate, having a boiling point of 140–142° C. at 1 millimeter of mercury pressure absolute, and having a refractive index, $n_D^{25}$ of 1.5152.

7. Monomeric ethyl vinylbenzylacetoacetate having a boiling point of 144–148° C. at 2 millimeters of mercury pressure absolute, and having a refractive index, $n_D^{25}$ of 1.5245.

8. Monomeric ethyl vinylbenzylacetate, having a boiling point of 123–128° C. at 1.5 millimeters of mercury pressure absolute, and a refractive index, $n_D^{25}$ of 1.5292.

9. Monomeric vinylphenylpentanedione-2,4, a red oil, soluble in ether, forming a green semi-solid copper chelate and giving a positive ferric chloride test for a diketone.

10. Monomeric 1-vinylbenzylacetyltrifluoroacetone, a brown liquid having a boiling point of 114–116° C. at 1.9 millimeters of mercury pressure absolute and forming a black, crystalline copper chelate.

11. Monomeric 1-vinylbenzylpentanedione-2,4, having a boiling point of 144–146° C. at 1.5 millimeters of mercury pressure absolute, and a refractive index, $n_D^{25}$ of 1.5619.

12. A method of preparing vinylbenzylacetone comprising (1) contacting vinylbenzyl chloride with an anhydrous alcoholic solution of sodium alkoxide and acetyl acetone at a temperature between room temperature and the reflux temperature of the solution for from 1 to 18 hours, (2) separating the product, (3) fractionating said product at a pH above about 8 and in the presence of an inorganic base and recovering the vinylbenzyl acetone as a water-white, sweet smelling monomer.

13. The copper chelate of 1-vinylbenzyl-4-phenyl-butanedione-2,4, melting at 132–136° C.

14. The copper chelate of 1-vinylbenzylpentanedione-2,4, a blue solid melting at 182–184° C.

15. The copper chelate of vinylbenzylacetylacetone, fibrous crystals decomposing at 230° C. without melting.

16. A normally solid polymer of vinylbenzylacetone.

17. A copolymer of styrene and at least 10 weight percent of vinylbenzylacetone.

18. A copolymer of acrylonitrile and at least 10 weight percent of vinylbenzylacetone.

19. A copolymer of methyl methacrylate and at least 10 weight percent of vinylbenzylacetone.

20. A copolymer of vinyl acetate and at least 10 weight percent of vinylbenzylacetone.

21. A copolymer of acrylic acid and at least 10 weight percent of vinylbenzylacetone.

22. A copolymer of acrylamide and at least 10 weight percent of vinylbenzylacetone.

23. A copolymer of butadiene and at least 10 weight percent of vinylbenzylacetone.

References Cited in the file of this patent

UNITED STATES PATENTS 2,874,151     Medalia et al.            Feb. 17, 1959

OTHER REFERENCES

Emerson et al.: J. Amer. Chem. Soc., vol. 69, August 1947, pp. 1905, 1906.